Jan. 15, 1952  R. O. HOGE  2,582,779
CAMERA HEAD
Filed Sept. 22, 1947  3 Sheets-Sheet 1
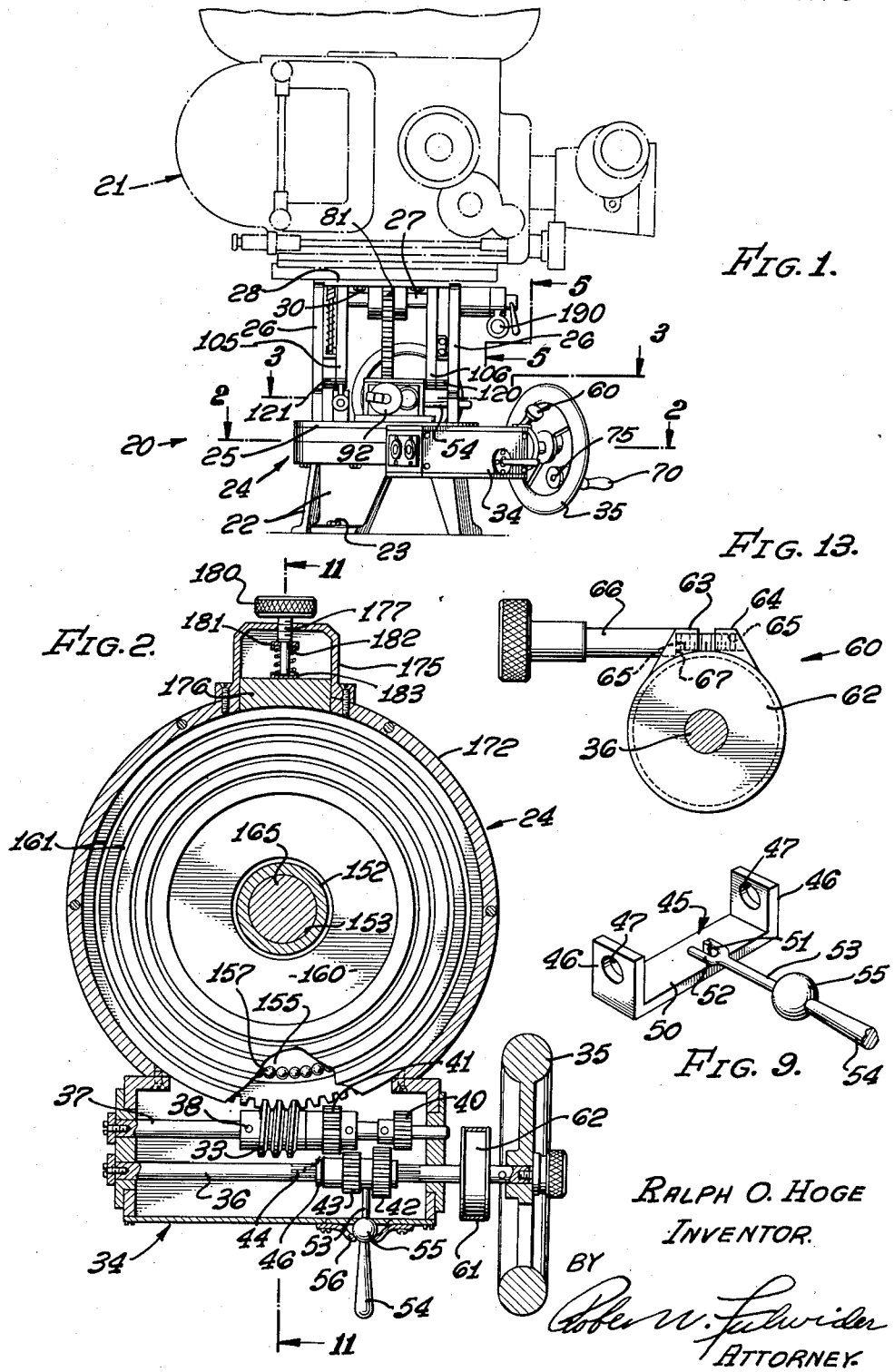
RALPH O. HOGE
INVENTOR.
BY
*Robert W. Fulwider*
ATTORNEY.

Jan. 15, 1952  R. O. HOGE  2,582,779
CAMERA HEAD
Filed Sept. 22, 1947  3 Sheets-Sheet 2
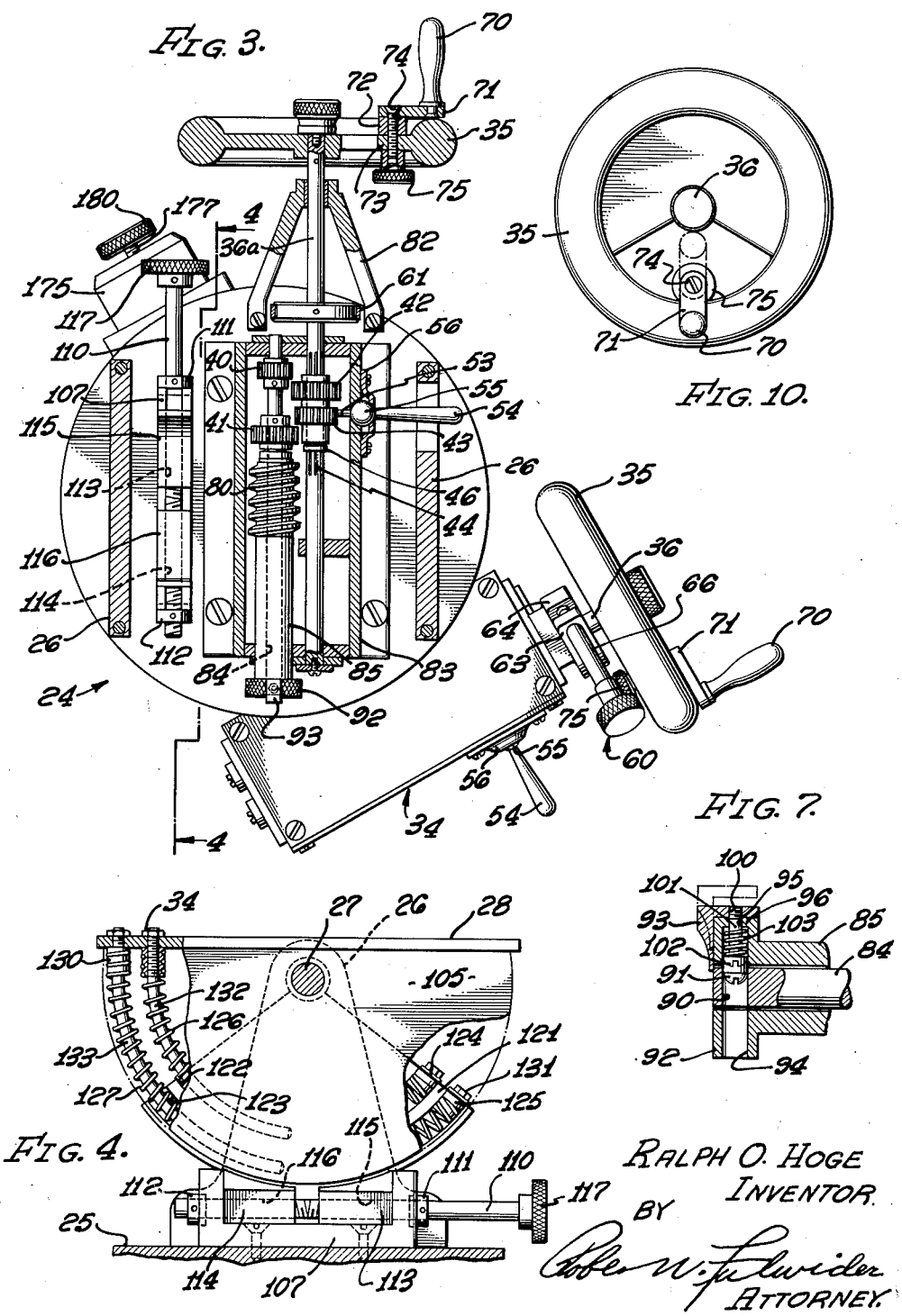
RALPH O. HOGE
INVENTOR.
BY
ATTORNEY.

Jan. 15, 1952  R. O. HOGE  2,582,779
CAMERA HEAD
Filed Sept. 22, 1947  3 Sheets-Sheet 3
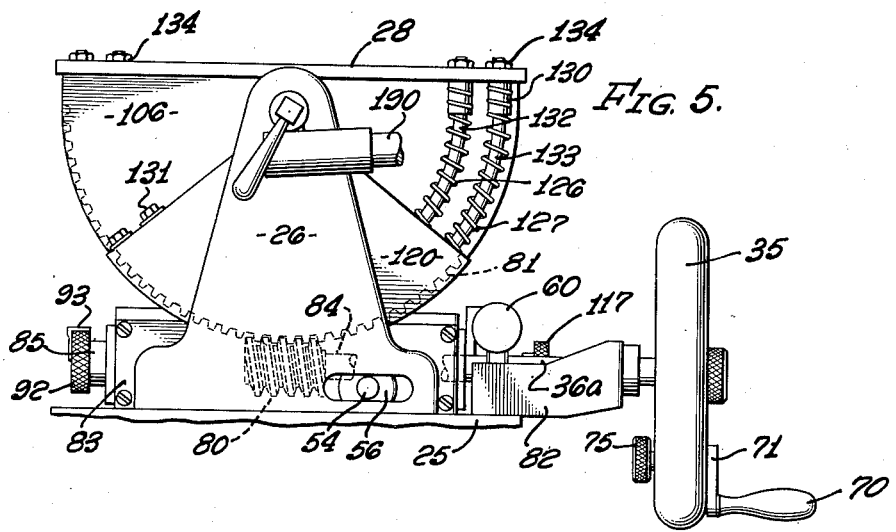
FIG. 5.
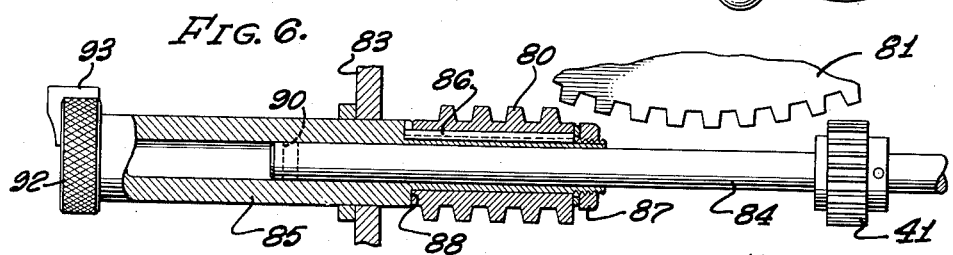
FIG. 6.
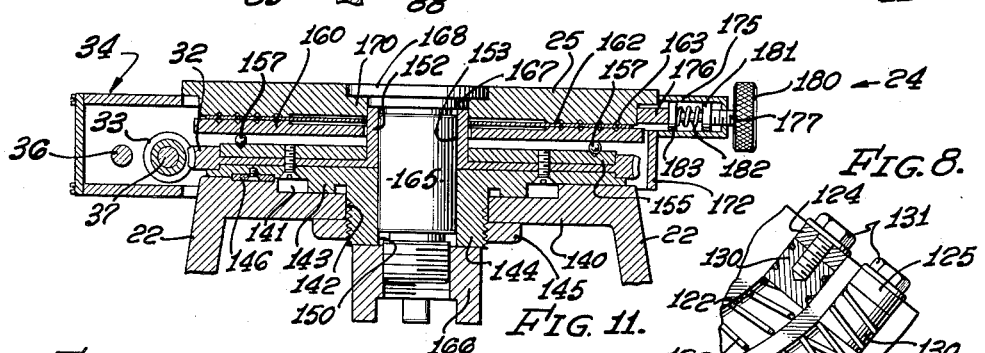
FIG. 8.
FIG. 11.
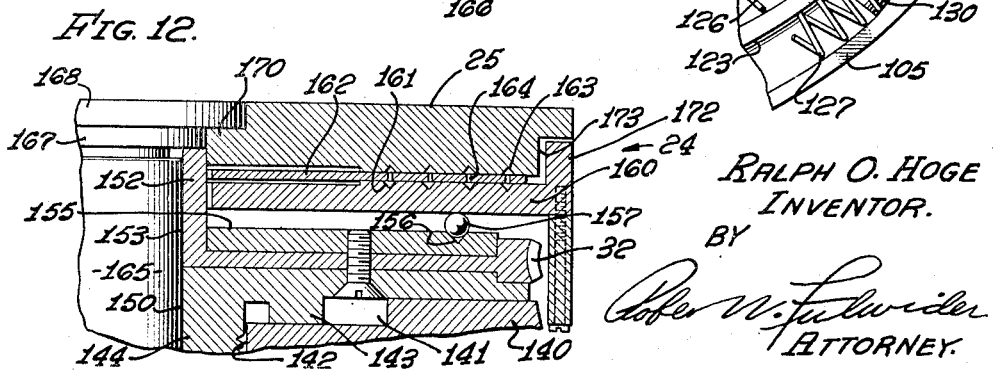
FIG. 12.
RALPH O. HOGE
INVENTOR.
BY
ATTORNEY.

Patented Jan. 15, 1952

2,582,779

UNITED STATES PATENT OFFICE 2,582,779

CAMERA HEAD

Ralph O. Hoge, Los Angeles, Calif., assignor to Thomas Rental, Inc., Los Angeles, Calif., a corporation of California Application September 22, 1947, Serial No. 775,526

6 Claims. (Cl. 248—183)

My invention relates generally to camera mounts of the type adapted to be mounted on a tripod or other supporting means, and to receive a heavy object, such as a motion picture camera, so that the latter may be moved about mutually perpendicular axes during the operation of the camera. In particular, my camera mount is adapted to be moved slowly and smoothly by means of a hand-operated gear train, or to be released from that gear train and moved freely from one position to another at the will of the operator, such mounts being known in the art as camera heads.

In order to lend variety and to sustain the interest in a motion picture, it is customary to move the camera so that the action being depicted may be followed as one would follow it with his eyes. Whether the camera is "panned" or swung about a vertical axis to follow horizontal movement, or whether it is tilted about a horizontal axis to follow vertical motion, the motion at all times must be smooth and free from annoying jerkiness if the best effects and a minimum of eyestrain are to be secured. It will be apparent, of course, that the movement of the camera must be coordinated with the motion being followed, and this requires that the speed of camera movement be controllable over a wide range.

Some of these necessary characteristics have been obtainable in camera heads which have heretofore been available, but in general these prior camera heads have had one or more objectionable features. For example, in order to support the weight of the present-day motion picture camera with its soundproof covering, it has been thought necessary to use a cradle-type of mounting in which the camera is moved about a horizontal axis by rolling it back and forth over a curved supporting member whereby the camera, in effect, is cradled in its mounting. This has resulted in a severe limitation in the amount of angular movement which is possible about the horizontal axis, and consequently many desirable effects have been unobtainable with the previously available camera heads.

It is therefore a major object of my invention to provide an improved camera head adapted to support a heavy camera so that the latter may be easily and smoothly moved about either or both of two mutually perpendicular axes at a speed which is under the control of the operator at all times.

Another object of my invention is to provide such a camera head having a wider range of movement than that previously available with generally similar camera heads.

It is a further object of my invention to provide a camera head of this general type which may be either gear driven or free swinging, and may be converted from one type of operation to the other in a matter of seconds at the will of the operator.

Still another object of my invention is to provide a camera head having the various operating controls within easy reach of the operator at all times, and adjustable so that the optimum control is obtained with a minimum of physical effort.

It is a still further object of my invention to provide such a camera head which, though capable of the precision control heretofore mentioned, is nevertheless ruggedly built to withstand the severe conditions of use to which it will be put.

These and other objects and advantages of my invention will become apparent from the following description of a preferred form thereof, and from the drawings illustrating those forms in which Fig. 1 is a side elevational view of my improved camera head, showing in phantom outline the position of a camera attached thereto;

Fig. 2 is a cross-sectional view taken at 2—2 in Fig. 1 with portions broken away to show the construction of the controls for swinging the camera horizontally about a vertical axis;

Fig. 3 is a cross-sectional view taken at 3—3 in Fig. 1 and showing the construction of the controls used to tilt the camera vertically about a horizontal axis;

Fig. 4 is a view taken at 4—4 in Fig. 3 and showing the spring counterbalancing means and the manually operable brake used to control the tilting of the camera;

Fig. 5 is a side elevational view of the camera tilt control, taken at 5—5 in Fig. 1;

Fig. 6 is a cross-sectional view showing the method of releasing the camera for free, as opposed to gear driven, motion about a horizontal axis;

Fig. 7 is a cross-sectional view of the detent used in connection with the gear control mechanism shown in Fig. 6;

Fig. 8 is a cross-sectional view indicating the method of anchoring the counterbalancing springs used in connection with the tilt control of the camera head;

Fig. 9 is a perspective view of the gear changing lever and yoke used in connection with both the swing and tilt controls;

Fig. 10 is an end elevational view of the hand wheel used in the operation of both the swing and tilt gear drives, indicating the plurality of positions available for the projecting handle attached thereto;

Fig. 11 is a cross-sectional view taken at 11—11 in Fig. 2 to show the construction of the swing control mechanism;

Fig. 12 is an enlarged cross-sectional view of a portion of the elements shown in Fig. 11 but taken at an angle thereto for the sake of clarity; and Fig. 13 is a side elevational view of a hand operated brake used to prevent the movement of the hand wheel controlling the operation of the swing gears.

Referring now to the drawings and particularly to Figs. 1 and 2 thereof the numeral 20 indicates generally my improved camera head which is adapted to be attached in any suitable and well known manner to a tripod or other suitable form of support (not shown), and to carry a camera 21 or other desired equipment upon its upper surface. The lower portion of the camera head 20 is provided with downwardly extending legs 22 which are firmly anchored to the supporting member (not shown) as by bolts 23. At the upper ends of the legs 22 I provide a generally cylindrical member 24 containing the various elements which go to make up the controls for swinging the camera 21 about a vertical axis. The upper surface of the generally cylindrical member 24 consists of a plate 25 whose rotation about the vertical axis is under the control of the operator at all times, and mounted on the plate are a pair of uprights 26 having a shaft 27 journalled in their upper ends for rotation about a horizontal axis. The shaft 27 in turn carries a mounting plate 28 for rotation with the shaft, and the camera 21 is adapted to be attached to the mounting plate by any suitable means such as bolts 30. The camera 21 may thus be swung about the vertical axis determined by the cylindrical member 24, and may also be tilted about the horizontal axis determined by the shaft 27, these motions occurring either simultaneously or independently of each other.

It will be apparent that, depending upon the motion being followed, the camera 21 must be rotated with respect to its support at varying speed. Where the movement is quite slow, the camera will of course be moved very slowly, and the position of the subject within the field of the camera will be very accurately controlled. On the other hand, where the action being followed is quite fast and the camera must be moved rapidly, the positioning of the subject within the field of the camera is not quite so accurately controlled. These circumstances suggest that for slow movement of the camera, a relatively "fine" control be provided, while for more rapid movement, a "coarse" control is indicated. These two types of control have been provided in my improved camera head by means of a two-speed gear drive, shown in Fig. 2. The detailed construction and operation of the cylindrical member 24 is explained hereinafter, but at present it may be stated briefly as comprising a gear 32 affixed to the legs 22, and engaged by a worm 33 which is connected with the top plate 25. It will be apparent that since the gear 32 is held against rotation, rotation of the worm 33 about its axis will cause the worm to be moved about the periphery of the gear 32, the worm carrying with it the top plate 25.

The worm 33 is enclosed within a houisng 34, and to drive the worm I provide a hand wheel 35 which is supported on a shaft 36 extending from the housing. It will be noted that the shaft 36 is parallel to but not co-axial with the worm 33, the latter being mounted upon its own shaft 37 a slight distance from the shaft 36. Both the shafts 36 and 37 are journalled or otherwise suitably held by the housing 34, the shafts being freely rotatable therein but held against longitudinal movement. The worm 33 is held by pins 38 or other suitable means against all movement with respect to the shaft 37, and mounted on the shaft 37 to turn the latter and the worm 33 are a pair of spur gears 40 and 41, the gear 40 having a slightly smaller diameter than the gear 41. A pair of cooperating gears 42 and 43, adapted to cooperate with the gears 40 and 41, respectively, are mounted on the shaft 36 for rotation therewith and for longitudinal movement with respect thereto. One of the most convenient methods of doing this is to provide splines 44 on the shaft 36 fitting into cooperating splines (not shown) on the gears 42 and 43. The gears 42 and 43 are so located with respect to the gears 40 and 41 that gear 42 may mesh with gear 40 to provide a relatively high speed drive for the shaft 37, or gear 43 may mesh with gear 41 to provide a relatively low speed drive. In addition, it is generally advisable to provide a neutral position where neither of the gears 42 and 43 mesh with the gears 40 and 41, this neutral position being indicated in both Figs. 2 and 3.

To accomplish the shifting of the gears 42 and 43, I provide a yoke 45 whose arms 46 are provided with holes 47 adapted to receive the shaft 36, and the arms 46 are so spaced that they engage or bear against the ends of the gears 42 and 43. The base 50 of the yoke 45 is located beneath the gears 42 and 43, clearing the latter, and is provided with an upwardly extending pin 51 adapted to be engaged by the bifurcated end 52 of a shifting lever 53 which extends through the housing 34. The outer end of the shifting lever 53 is formed as a handle 54, and a generally spherical enlargement 55 is formed on the shifting lever adjacent the wall of the housing 34 to fit into a socket 56 for support thereby. In this way, when the handle 54 is moved toward the hand wheel 35, gear 43 is meshed with gear 41, and there is a reduction in the speed of rotation of shaft 37 over that of shaft 36, thereby producing a finer control of the horizontal swinging of the camera. When the handle 54 is moved away from the hand wheel 35, gear 42 is meshed with gear 40 and shaft 37 turns at a higher rate of speed than shaft 36 to provide a coarser but faster control of the camera. Intermediate the two positions just described is the neutral position where neither of the driving gears 42 and 43 mesh with either of the driven gears 40 and 41. When the lever 54 is in its neutral position, rotation of the hand wheel 35 has no effect upon the positioning of the camera 21.

When the proper position of the camera 21 has been selected and it is desired to maintain this position, the hand wheel 35 may be locked against rotation by means of the clamp 60 shown in Fig. 13. Essentially, the brake 60 includes a brake band 61 adapted to encircle a brake drum 62 firmly connected to the shaft 36, and the ends of the brake band are movable together to grip the drum and prevent the rotation of the latter. The ends of the brake band 61 are provided with ears 63 and 64 having aligned holes 65 therein adapted to receive a threaded rod 66. The hole 65 in the ear 64 is provided with cooperating screw threads adapted to engage the threads on the rod 66, while the hole in the ear 63 is sufficiently large to receive the threaded portion of the rod without engaging the threads of the latter or binding against it. The brake 60 is held against rotation by securing one of the ears 63 or 64 to the housing 34, or by holding the rod 66 thereto. Adjacent the threaded end of the rod 66, I provide a shoulder 67 which bears against a cooperating portion of the ear 63 to force the latter toward the ear 64 when the rod 66 is turned in the proper direction. As the ears 63 and 64 are moved together, the brake band 61 grips the drum 62 to hold the latter against rotation, thereby locking or clamping the wheel 35 and the shaft 36 against rotation.

For convenience in rotating the hand wheel 35, I may provide the latter with an outwardly extending handle 70 as is customary in hand wheels of this general type. However, I have further improved this type of manual control by making it possible to vary the radial distance of the handle 70 from the center of the shaft 36. When the shaft 36 is to be rotated at a relatively low speed, it is more convenient to have the handle 70 at a considerable distance from the axis of the shaft so that the movement of the camera may be more accurately controlled. However, when the camera is to be moved at a rather high speed, it is preferable to have the handle 70 quite near the axis of the shaft 36 so that the operator will not be required to do as much work in moving the camera. Consequently, as indicated in Figs. 3 and 10, I have mounted the handle 70 upon a crank 71 which in turn is rotatably attached to the hand wheel 35 at a point displaced from the axis of the shaft 36. The crank 71 is provided with a stub shaft 72 extending generally parallel to the shaft 36 and bearing against a flange-like member 73 extending inwardly from the outer portion of the hand wheel 35. The stub shaft 72 is held to the flange 73 by an axially extending screw 74 extending therethrough, and a thumb nut 75 engages the free end of the screw to hold the stub shaft in position. Preferably, a series of detents (not shown) are provided to assist in holding the handle 70 in any one of a number of predetermined positions such as those indicated in Fig. 10. In this way, the throw of the crank 71 may be varied to meet the different operating conditions.

To tilt the camera 21 about the horizontal shaft 27, I employ a gear drive somewhat similar to that just described in connection with the swinging of the camera about the vertical axis. As indicated in Fig. 5, a worm 80 is rotated by a hand wheel 35, and drives a gear 81 about the axis of the horizontal shaft 27. The gear 81 is connected to the mounting plate 28 so that rotation of the gear insures the corresponding simultaneous rotation of the mounting plate. The method of driving the worm 80 is very similar to that used in driving the worm 33 previously described, but there are some differences in construction and operation which are indicated in Fig. 3. As indicated therein, the hand wheel 35 is mounted on a shaft 36a, similar to the shaft 36 but somewhat longer for convenience in operation. A brace or support 82 is provided for the wheel end of the shaft 36a, and a brake 60 permits the shaft and wheel to be locked in any desired position. Beneath the gear 81 is a gear housing 83 from which the shaft 36a projects, and within the housing is the same arrangement and combination of driven gears 40 and 41 and driving gears 42 and 43 as that previously described in connection with Fig. 2. The driving gears 42 and 43 are shifted relative to the driven gears 40 and 41 by a shifting lever 53, similar to that previously described, the driven gears being mounted upon a shaft 84 generally similar to the shaft 37 of the previously described gear drive. When the worm 80 engages the gear 81, and when one of the driving gears 42 and 43 engages one of the driven gears 40 and 41, rotation of the hand wheel 35 will tilt the camera about the shaft 27 as the operator desires.

It is very often important, however, that the worm 80 may be disengaged from the gear 81 so that the camera may be freely and quickly tilted to any desired position. In order to accomplish this, I have provided the disconnecting means indicated in Figs. 6 and 7. It will be realized that if the worm 80 is rotated about its axis, there will be relative movement between the worm and the gear 81. Consequently, if the gear is held stationary while the worm 80 is rotated, the worm will be moved longitudinally along its axis until it is eventually disengaged from the gear 81. This condition is illustrated in Fig. 6. The gear 81 is then free to rotate about the axis of shaft 27, and the camera 21 may be freely tilted to any desired position within the limits of its movement.

To make use of this feature it will be apparent that the worm 80 must be engageable and disengageable with respect to the shaft 84 at the will of the operator. While there are obviously many different methods of accomplishing this, I have found that one of the most satisfactory is to rigidly connect the worm 80 to a tubular member 85 which in turn can be secured to the shaft by a pin for movement therewith, or may be released for movement with respect to the shaft by disengaging the pin. As indicated in Fig. 6, the end of the shaft 84 opposite the hand wheel 35 is unsupported except by the tubular member 85, the latter acting as a bushing which extends through a wall of the housing 83 so that the shaft is supported thereby. The major portion of the tubular member 85 has a diameter substantially equal to the root diameter of the worm 80, while the inner end of the member is formed to provide a section of smaller diameter on which the worm is mounted. A key 86 engages corresponding key ways in the worm 80 and the tubular member 85 to insure their rotation as a unit, and the innermost end of the tubular member is threaded to receive a nut 87 which bears against one end of the worm and prevents the latter from being moved off the tubular member. A shoulder 88 is formed by the aforementioned reduction in diameter of the tubular member 85, and the other end of the worm bears against this shoulder so that the worm is held against axial movement in either direction with respect to the tubular member.

The end of the shaft 84 extends through the wall of the housing 83 as shown, and at a point located outwardly from this wall, is provided with a diametrically extending hole 90. As indicated in Fig. 7, this hole 90 is adapted to receive a pin 91 which is carried by the tubular member 85, and means are provided for releasing the pin when the tubular member is to be moved with respect to the shaft 84. It is sometimes desirable to be able to rotate the tubular member 85 with respect to the shaft, and to facilitate this, I have provided an enlarged knurled head 92 on the end of the tubular member. Slidably mounted on the knurled head 92 is an L-shaped member 93 having one leg extending radially inwardly toward the center of the head along the outer face thereof, with the other leg extending in a generally axial direction across the periphery of the knob. A hole 94 is bored radially through the knob 92 from a point substantially diametrically opposite the slide 93 to a point just inside the opposite surface of the knob, while a smaller diameter hole 95, co-axial with the larger hole 94, extends the remainder of the distance through the knob 92 to form an inwardly projecting flange or shoulder 96 adjacent the slide 93. A corresponding hole 100, aligned with the holes 94 and 95, is formed in the slide 93, and is threaded to receive an inwardly projecting screw 101 forming a part of the pin 91. Preferably, the screw 101 is provided with a tubular sleeve 102 extending along the shank from the screw head toward the slide 93, or the screw may be formed as a shoulder stud to provide an adequate bearing surface to insure the rigid connection of tubular member 85 to the shaft 84. A helical spring 103 surrounds the shank of the screw 101, extending between the shoulder 96 and the adjacent end of the sleeve 102, urging the pin assembly 91 and the slide 93 inwardly toward the axis of the shaft 84. In this way, the pin 91 normally locks the tubular member 85 to the shaft 84 for rotation therewith, but the two may be disengaged by urging the slide 93 outwardly, against the pressure of the spring 103, whereupon the tubular member and the shaft are free to rotate and move axially with respect to one another.

When the worm 80 is disengaged from the gear 81, the camera 21 would normally be free to tilt about the axis of shaft 27 if no restraining or locking means were provided. While this is sometimes desirable, it is generally much more important that the camera be held rigid so that there will be no unpleasant motion of the picture. For this reason, and for the reason, as previously mentioned, that the gear 81 must be held stationary while the worm 80 is being engaged or disengaged therewith, I have provided the tilt brake shown in Fig. 4. Rigidly affixed to the mounting plate 28 near the ends of the horizontal shaft 27 are a pair of segmental plates 105 and 106, both of said plates having a radius substantially equal to that of the worm gear 81. Mounted on the upper plate 25 of the cylindrical member 24, and aligned with the segmental plate 105, is a supporting clevis 107 whose base is firmly attached to the upper plate and whose arms extend upwardly to a point adjacent the segmental plate 105. A threaded rod 110 extends between the arms of the clevis 107, and is held against axial movement by any suitable means such as a pair of flanges 111 and 112 which bear against the corresponding arms to prevent longitudinal movement of the rod while permitting rotation thereof with respect to the clevis. The portion of the rod 110 between the arms of the clevis 107 is threaded so that one-half of this length has a right-hand screw thread formed thereon, while the other half has a left-hand screw thread. A pair of brake blocks 113 and 114 are mounted on the rod 110 between the ears of the clevis 107, and the blocks are provided with complementally threaded holes 115 and 116, respectively, through which the rod passes to support and move the blocks. The upper surfaces of the blocks 115 and 116 are curved as portions of an arc of a circle whose center is coaxial with the horizontal shaft 27, and the segmental plate 105 is formed as an arc having a similar center. Because of the opposite hand of the threads connecting the rod 110 to the brake blocks 115 and 116, rotation of the rod in one direction will urge the blocks together so that they bear against and frictionally engage the plate 105, while rotation of the rod in the opposite direction will separate the blocks so that the plate is released. For convenience, I provide the rod 110 with a handle or knob 117, the knob being on the same general side of the camera head as the other manually operated controls, as indicated in Fig. 3.

Inasmuch as motion picture cameras are relatively heavy, and since any camera 21 mounted upon the mounting plate 28 will have its center of gravity above the horizontal shaft 27, such an arrangement tends to produce an unstable system unless counterbalancing means are provided. While it is not absolutely essential that counterbalancing means be provided in order to secure the operation of the camera head herein described, the results are greatly improved, there is much greater ease of operation, and there is also a considerable reduction in wear of the various members when a counterbalancing system is used. Since it will be apparent that it is not practical to attempt to provide counterbalancing weights to counteract the mass of the camera 21, I have provided a resilient or spring counterbalancing system now to be described.

Adjacent the standards 26 and located inwardly therefrom are sector plates 120 and 121 against which the segmental plates 106 and 105, respectively, bear. The sector plates 120 and 121 are firmly anchored to the upper plate 25 and may, in fact, be formed as a part of the upright supports 26. In this way, they act as bearing surfaces to support and steady the segmental plates 105 and 106 and hence the horizontal shaft 27. On the inner surfaces of the sector plates 120 and 121 I form arcuate grooves or recesses 122 and 123 having the axis of shaft 27 as their center of rotation, and having plugs 124 and 125, respectively, closing one pair of adjacent ends. While the slots 122 and 123 may be formed so that they are closed at one end, it is usually more convenient to cut the slots completely through and then close them by means of the plugs 124 and 125 which may be held in place by the closeness of their fit, by welding, or by any other suitable means. From the plugs 124 and 125, I provide helical compression springs 126 and 127 which extend through the slots 122 and 123, respectively, to the mounting plate 28. At each end, the springs 126 and 127 are provided with core members 130 having a generally cylindrical shape and provided with helical grooves to receive the corresponding helical springs. The core members 130 at one end of the springs 126 and 127 are anchored to the plugs 124 and 125 as by bolts 131, while the cores at the opposite ends of the springs are firmly attached to the mounting plate 28.

To prevent the springs 126 and 127 from buckling, I attach arcuate rods 132 and 133 to the cores 130 anchoring the springs 126 and 127, respectively, to the mounting plate 28. These rods have the same curvature as the grooves or slots 122 and 123 and are centered within the latter, the springs 126 and 127 being located around the rods which extend from the mounting plate 28 into the sector plates 120 and 121. Preferably, the outer ends of the rods 132 and 133 are threaded to receive the cores 130, with the ends of the rods passing through the mounting plate 28 and being held thereto by nuts 134.

The natural tendency of the springs 126 and 127 thus tends to urge the mounting plate 28 to rotate about the shaft 27 in a direction to expand the springs. The sector plates 120 and 121 are constructed so that the corresponding springs 126 and 127 are anchored on opposite radial surfaces of the plates so that the mounting plate 28 is urged to rotate in opposite directions about the shaft 27. By properly correlating the strength of the springs 126 and 127 of each of the sector plates 120 and 121, these forces will be equal when the mounting plate 28 is horizontal and there will be no tendency for the plate to tilt either forwardly or backwardly. However, when the plate 28 is tilted forwardly, thereby compressing the springs connected to the sector plate 121, the total force exerted by the springs 126 and 127 connected to this plate will be greater than the force exerted by the corresponding springs connected to plate 120. Consequently, there will be a restoring force tending to return the mounting plate 28 to its center, horizontal position. The weight of the camera 21, however, mounted upon the plate 28, has its center of gravity above the shaft 27 and thus opposes the restoring force exerted by the springs connected to the sector plate 121. By the proper adjustment of the strength of the respective springs, it is possible to counterbalance the weight of the camera 21 so that substantially no work is required to tilt the camera in either direction about the axis of shaft 27. The function of the rods 132 and 133, of course, is to prevent the springs 126 and 127 from buckling, and the length of the rods is so proportioned with the amount of angular movement of the plate 28 that the springs are held against buckling in either limiting position and in all intermediate positions.

Operation of tilt control

The operation of the various controls used in tilting the camera 21 will now be understood. Assuming first that the worm 80 is in engagement with the gear 81 and it is desired to operate the camera head as a gear driven device, the knob 117 is operated to release the brake blocks 115 and 116 from the segmental plate 105, and the shifting lever 54 is operated to engage either the high speed or low speed gears within the housing 83. The brake 60 is then released to permit the rotation of the shaft 36a, and by rotating the wheel 35 attached to this shaft, the camera 21 will be tilted upwardly or downwardly. Reversing the direction of rotation of the wheel 35 will reverse the direction of movement of the camera, and the speed of movement of the camera for a given speed of rotation of the wheel may be changed by shifting the position of the lever 54 to effect the engagement of the high speed or low speed gears 40 to 43.

The camera 21 may be locked in any desired position by operating the control knob 117 so that the brake blocks 115 and 116 are wedged against the segmental plate 105 when the latter is in this position. A similar locking effect may be obtained by operating the brake 60 to lock the shaft 36a, but it will be noted that this brake acts only on this shaft and not on the worm 80. Consequently, if the shifting lever 54 is moved to place the gears 40 to 43 in neutral position, the worm 80 may be rotated by the knob 92 even though the shaft 36a remains locked.

To convert the head from a gear driven to a free swinging camera head, the brake blocks 115 and 116 are set against the segmental plate 105 to hold the latter against rotation, and the slide 93 of the knob 92 is urged upwardly to disengage the pin 91 from the shaft 84. The knob 92 is then rotated to disengage the worm 80 from the gear 81, the latter being held against movement by the action of the brake blocks 115 and 116 acting upon the segmental plate 105. As indicated in Fig. 6, rotation of the knob 92 will cause the sleeve 85 to be moved outwardly, in the direction of the arrow, thereby completely separating the worm 80 from the worm gear 81. The brake blocks 115 and 116 may then be released, and the camera 21 is then capable of free movement about the axis of shaft 27, the springs 126 and 127 acting to counterbalance the weight of the camera at all times. By varying the pressure of the brake blocks 115 and 116 against the segmental plate 105, the force required to move the camera 21 may be varied over a wide range as occasion may demand. To return the head from free to gear-driven operation, it is only necessary to hold the segmental plate 105 against rotation, and then rotate the knob 92 in the opposite direction to that previously used, until the pin 91 again fits into the hole 90 to insure the simultaneous rotation of the shaft 84 and the sleeve 85.

Description of swing or pan control

In order to move the camera about a vertical axis to follow horizontal movement of a subject, I provide the swing or pan control mechanism shown in Figs. 2, 11 and 12. As previously mentioned, this control is housed within a generally cylindrical member 24 and is supported by downwardly extending legs 22. At their upper ends, the legs 22 connect to a central supporting plate 140 having a centrally disposed recess 141 on its upper surface and an axial hole 142 extending therethrough. Mounted upon the upper surface of the central supporting plate 140 is a backing plate 143 having a downwardly projecting central boss 144 adapted to extend through the central opening 142 of the supporting plate 140 and be firmly held thereto by a nut 145. A key 146 is attached to the undersurface of the backing plate 143 and fits into a corresponding slot in the upper surface of the central supporting plate 140 to prevent rotation of the backing plate with respect to the supporting plate.

The backing plate 143 has an axially extending bore 150 therethrough, and a gear 32, connected to the upper surface of the backing plate, is provided with an upwardly extending boss 152 having axial bore 153 extending therethrough, the same size as the bore 150. A bearing plate 155 is mounted upon the upper surface of the gear 32, and the bearing plate, gear, and backing plate 143 are rigidly connected together to act as a single unit.

Near its periphery, the bearing plate 155 is provided with a circular groove 156 on its upper surface, adapted to receive ball bearings 157. Located above the bearing plate 155 is a rotatable plate 160, concentric with the boss 152 and rotatable with respect to the latter. While the rotatable plate 160 may be freely turned with respect to the boss 152, there is a minimum of clearance between the two and the undersurface of the plate bears against the ball bearings 157 carried by the bearing plate 155. In this way, the rotatable plate 160 is held against any substantial linear movement in a horizontal plane, while being freely rotatable at all times. The upper surface of the rotatable plate 160 has a plurality of grooves 161 formed therein to receive a lubricant, and the central portion of the upper surface is relieved or provided with a slight recess so that a fiber friction plate 162 resting upon the rotatable plate 160 will bear against only the outer portion of the latter. The friction plate 162, like the rotatable plate 160, is concentric with the boss 152 and is rotatable with respect to the latter.

As indicated in Figs. 11 and 12, the friction plate 162 supports the upper plate 25 of the cylindrical portion 24, the upper plate being concentric with the boss 152 and likewise rotatable with respect to it. Near its periphery, the upper plate 25 is provided on its lower surface with a series of circular grooves 163, similar to the grooves 161 of the rotatable plate 160 and aligned with the latter. These grooves are likewise filled with lubricant, and the central portion of the undersurface of the upper plate 25 is relieved like the adjacent portion of the rotatable plate 160 so that all bearing of the friction plate 162 with the rotatable plate 160 and/or the upper plate 25 occurs near the outer edge of the friction plate. The latter is preferably provided with a series of perforations 164 extending through the plate and aligned with the grooves 161 and 163 to insure the more uniform distribution of the lubricant between the bearing surfaces.

To retain the upper plate 25, the friction plate 162, and the rotatable plate 160 in their proper axial positions, I provide a central shaft 165 adapted to extend through the bosses 152 and 144 and be retained therein by a nut 166 on the lower end of the shaft. The upper end of the shaft 165 is provided with a pair of outwardly extending flanges 167 and 168, the inner, smaller one having a diameter substantially equal to that of the outer diameter of the boss 152. The smaller flange 167 thus rests against the upper end of the boss 152 which in turn is held by the boss 144, the lower surface of the latter being that which the nut 166 bears against. Consequently, by tightening the nut 166, the stub shaft 165 may be very firmly and rigidly held to the non-rotatable portions of the cylindrical member 24.

The lower portion of the axial hole extending through the upper plate 25 is formed just large enough to permit the free turning of the plate with respect to the boss 152 and the flange 167, while the upper portion of this hole is enlarged to provide a cut-away portion adapted to receive the upper, larger flange 168 of the stub shaft. In this way, a shoulder 170 is formed in the central portion of the upper surface of the plate 25, and the larger flange 168 bears against this shoulder to prevent the axial movement of the plate while permitting its free rotation with respect thereto. Consequently, with the elements thus far described, the plate 25 may be freely rotated with respect to the supporting legs 22, and sliding friction will occur between this plate and the bearing plate 160, and/or between the bearing plate 160 and the backing plate 155. Generally, however, such free rotation of a camera is not desirable when motion pictures are being photographed, and consequently the gear mechanism contained within the housing 34 is adapted to rotate the upper plate 25 when the wheel 35 is turned. To accomplish this, the rotatable plate 160 is provided with a rim 172 adapted to fit within a peripheral recess 173 of the top plate 25, and to extend downwardly to a point slightly below the upper surface of the central supporting plate 140. In this way, lubricant within the grooves 161 and 163 is retained therein, while the teeth of the gear 32 are covered. At one side, the rim 172 is cut away as indicated in Fig. 2 and the housing 34 is attached thereto so that the worm 33 engages and meshes with the gear 32. Consequently, when the handle 35 is rotated, the gear 32 remains stationary and the housing 34, the rim 172, and the bearing plate 160 all rotate about the stub shaft 165.

In order to insure that the upper plate 25 will turn with the rotatable plate 160 when the latter is driven by the gear mechanism in the manner just described, I provide a friction brake arrangement mounted on the rim 172 and adapted to engage the upper plate 25. As shown in Fig. 2, at a point substantially diametrically opposite from the housing 34, I provide a brake housing 175. The brake housing 175 consists of a hollow box-like member which is open at one end and attached at that end to the rim 172. The latter is cut away where it is covered by the housing 175, and a brake shoe 176 is mounted within the housing to bear against the upper plate 25. As indicated in Fig. 2, the brake shoe 176 fits snugly within the housing 175 to prevent lateral movement of the shoe, and the radial position of the shoe is controlled by a threaded rod 177 which extends through the opposite end of the housing. A knob 180 is provided for convenience in rotating the rod 177, and the inner end of the rod is provided with a section of reduced diameter forming a shoulder against which a cup-shaped washer 181 is adapted to bear. A helical compression spring 182 is placed over the reduced section of the rod 177, one end of the spring fitting within the washer 181, while the other end of the spring fits into and bears against a similar cup-shaped washer 183 mounted on the outer surface of the brake shoe 176. In this way, by turning the knob 180 to move the rod 177 inwardly, compression of the spring 182 is increased to cause the brake shoe 176 to bear against the upper plate 25 with increasing pressure. When the brake block 176 firmly engages the upper plate 25, the frictional engagement between the two is so complete as to prevent their relative motion under any normal conditions. Consequently, when the knob 180 is turned to tighten the brake block 176, the upper plate 25 rotates or remains stationary with the rotatable plate 160 and the rim 172. Under these conditions, all control of the swinging or pan movement of the camera 21 is controlled by the wheel 35 of the gear box 34 which is attached to the rim 172. With the brake shoe 176 released, the upper plate 25 may rotate independently of the rim 172 and the ease with which the camera may be turned under these conditions may be adjusted by varying the pressure of the brake shoe 176 against the upper plate 25.

To complete the camera head, I prefer to attach a rearwardly projecting handle 190, shown in Fig. 5, to the horizontal shaft 27 and extending rearwardly from the latter so that the camera may be swung about a vertical axis and tilted about a horizontal axis with increased ease and maneuverability when the camera head is operated as a free head with regard to either or both of its axes of movement. Such handles or arms as the one indicated in Fig. 5 are well known in the art, and hence it is believed that the partial illustration of this device is sufficient for the present purposes.

*Operation of swing or pan control*

When it is desired to pan, i. e., swing the camera about a vertical axis, and assuming that this is to be done by means of the gear mechanism described, the knob 180 is rotated to tighten the brake block 176 against the upper plate 25, and the handle 54 of the gear change mechanism is shifted to engage either the high or low speed gears 40 to 43, inclusive. The wheel 35 is then turned and the gear housing 34, the rim 172, the upper plate 25, and the camera 21 will all be simultaneously rotated about the axis of the stub shaft 165. Reversing the direction of rotation of the wheel 35 will reverse the direction of rotation of the camera 21, and the speed of rotation for a given speed of the wheel 35 may be changed by shifting the position of the lever 54 to control the engagement of the high and low speed gears. The camera may be locked at any desired position by setting the brake 60 on the shaft 36 so that the wheel 35 may not be rotated, and the camera head may be converted to a free head by releasing the brake block 176 as previously described.

It will be seen that both the tilt control and the pan or swing control may be operated independently, or the two may be operated simultaneously. Furthermore, either or both of these controls may be operated through the gear mechanisms described, each of them being independent of the other. It will thus be appreciated that I have provided a camera head which is particularly suitable for use with large, heavy cameras such as the present motion picture or television cameras. The counterbalancing arrangement decreases the wear of the moving parts and makes the device easier to operate, while the choice of high or low speed gear operation or free movement of the head about either of the two perpendicular axes increases the ease and versatility of operation.

While I have shown and described a preferred form of my invention, it will be apparent that modifications may be made therein without departing from the broad features as herein defined. Consequently, I do not wish to be restricted to the particular form or arrangement of parts herein described and shown, except as limited by my claims.

I claim:

1. A camera head which includes: a base adapted to be rigidly mounted on a supporting member; a plate mounted on said base for rotation with respect thereto; anti-friction bearing means between said plate and said base adapted to transmit the load of said plate to said base; a disc mounted on said plate; a cover mounted on said disc for rotation with respect to said plate and to said base, said cover and said plate having circumferential grooves formed in their adjoining surfaces to receive a lubricant; means operable to rotate said plate with respect to said base; friction coupling means between said plate and said cover, engageable to cause said cover to rotate with said plate, and releasable so that said cover may rotate with respect to said plate; and means attached to said cover, adapted to have a camera attached thereto.

2. A camera head which includes: a base adapted to be rigidly attached to a supporting member; a worm gear rigidly connected to said base and having its axis substantially perpendicular to the mounting plane of said base; a shaft extending through said base and said gear, coaxial with the latter; a plate co-axial with said shaft and rotatable with respect to the latter; anti-friction bearing means between said plate and said gear to support the load of the latter; a disc co-axial with said shaft and mounted on said plate for rotation with respect to the latter and said shaft; a cover co-axial with said shaft, mounted on said disc for rotation with respect to the latter, said plate, and said shaft, the adjacent surfaces of said cover and said plate having circumferential grooves formed therein to receive a lubricant; a gear housing attached to said plate and movable therewith; a worm within said housing, adapted to engage said worm gear; a driven shaft mounted in said housing and supporting said worm; a drive shaft mounted in said housing; shiftable gears mounted on said drive shaft and said driven shaft adapted to transmit rotation from said drive shaft to said driven shaft, and shiftable to vary the relative speeds of rotation of said shafts; manually operable means to rotate said drive shaft; releasable brake means connected to said drive shaft to hold the latter against rotation; a friction brake housing connected to said plate for rotation therewith; a brake shoe within said housing adapted to bear against said cover; manually operable means attached to said brake housing to control the pressure exerted by said brake shoe against said cover, whereby said cover may be held by said shoe for rotation with said plate, or may be released for rotation independently thereof; and a tiltable member adapted to receive a camera, mounted on said cover for rotation about an axis substantially perpendicular to the axis of said first-mentioned shaft.

3. A camera head which includes: a base adapted to be rigidly attached to a supporting member; a swingable member connected to said base for rotation with respect thereto; a shaft spaced from said swingable member, the axis of said shaft being substantially perpendicular to the axis of rotation of said swingable member; supporting means connecting said shaft to said swingable member; a tiltable member adapted to receive a camera, mounted on said shaft for rotation about the axis of the latter; resilient means connected between said tiltable member and said supporting means to yieldably oppose the rotation of said tiltable member about said axis of said shaft; friction brake means mounted on said swingable member and operable to bear against said tiltable member to hold the latter against rotation; a worm gear connected to said tiltable member for rotation with the latter about said axis of said shaft; a worm adapted to engage said worm gear; a driven shaft, mounted on said swingable member for axial rotation with respect to said member; a drive shaft, mounted on said swingable member for axial rotation with respect to said member; shiftable gear means mounted on said driving and driven shafts to transmit rotation from said drive shaft to said driven shaft, and adjustable to vary the relative speeds of rotation; a sleeve mounted on said driven shaft and connected to said second worm, said second worm and said sleeve being rotatable and axially movable with respect to said second driven shaft; a releasable pin adapted to extend between said sleeve and said second driven shaft to connect the two and thereby prevent relative movement therebetween; means adapted to release said pin from said locking position, whereby said sleeve and said worm may be moved axially and rotatably with respect to said driven shaft; and manually operable means to rotate said sleeve, whereby rotation of said means while said pin releasing means is in released position causes the rotation of said worm with respect to said worm gear to move said worm axially and thereby disengage said worm from said worm gear, while rotation of said means in the opposite direction causes the re-engagement of said worm with said worm gear, said worm gear being held against rotation during both of these operations, and rotation of the worm when the latter is held against axial movement by said pin causes the rotation of said worm gear about said axis of said shaft.

4. A camera head which includes: a base adapted to be rigidly attached to a supporting member; a worm gear rigidly connected to said base and having its axis substantially perpendicular to the mounting plane of said base; a shaft extending through said base and said gear, co-axial with the latter; a plate co-axial with said shaft and rotatable with respect to the latter; anti-friction bearing means between said plate and said gear to support the load of the latter; a disc co-axial with said shaft and mounted on said plate for rotation with respect to the latter and said shaft; a cover co-axial with said shaft, mounted on said disc for rotation with respect to the latter, said plate, and said shaft, the adjacent surfaces of said cover and said plate having circumferential groovees formed therein to receive a lubricant; a gear housing attached to said plate and movable therewith; a worm within said housing adapted to engage said worm gear; a driven shaft mounted in said housing and supporting said worm; a drive shaft mounted in said housing; shiftable gears mounted on said drive shaft and said driven shaft adapted to transmit rotation from said drive shaft to said driven shaft, and shiftable to vary the relative speeds of rotation of said shafts; manually operable means to rotate said drive shaft; releasable brake means connected to said drive shaft to hold the latter against rotation; a friction brake housing connected to said plate for rotation therewith; a brake shoe within said housing adapted to bear against said cover; manually operable means attached to said brake housing to control the pressure exerted by said brake shoe against said cover, whereby said cover may be held by said shoe for rotation with said plate, or may be released for rotation independently thereof; a second shaft spaced from said cover and parallel thereto, the axis of said second shaft being substantially perpendicular to the axis of said first-mentioned shaft; supporting means connecting said shaft to said cover; a tiltable member adapted to receive a camera, mounted on said second shaft for rotation about the axis of the latter; resilient means connected between said tiltable member and said supporting means to yieldably oppose the rotation of said tiltable member about said axis of said second shaft; friction brake means mounted on said cover and operable to bear against said tiltable member to hold the latter against rotation; a second worm gear, connected to said tiltable member for rotation with the latter about said axis of said second shaft; a second worm, adapted to engage said second worm gear; a second driven shaft, mounted on said cover for axial rotation with respect to said cover; a second drive shaft, mounted on said cover for axial rotation with respect to said cover; shiftable gear means mounted on said drive and driven shafts to transmit rotation from said drive shaft to said driven shaft, and adjustable to vary the relative speeds of rotation; a sleeve mounted on said driven shaft and connected to said second worm, said second worm and said sleeve being rotatable and axially movable with respect to said second driven shaft; a releasable pin adapted to extend between said sleeve and said second driven shaft to connect the two and thereby prevent relative movement therebetween; means adapted to release said pin from said locking position, whereby said sleeve and said worm may be moved axially and rotatably with respect to said second driven shaft; and manually operable means to rotate said sleeve, whereby rotation of said means while said pin releasing means is in released position causes the rotation of said worm with respect to said worm gear to move said worm axially and thereby disengage said worm from said worm gear, while rotation of said means in the opposite direction causes the re-engagement of said worm with said worm gear, said worm gear being held against rotation during both of these operations, and rotation of the worm when the latter is held against axial movement by said pin causes the rotation of said worm gear about said axis of said second shaft.

5. A camera head which includes: a base adapted to be rigidly mounted on a supporting member; a plate mounted on said base for rotation with respect thereto; a cover mounted on said plate for rotation with respect thereto; a worm gear mounted on said base and held therewith; a worm engaging said worm gear, connected to said plate and rotatable with said plate about the axis of said worm gear, but holding said plate against said rotation; transmission means mounted on said plate and connected to said worm to rotate the latter about its axis to thereby rotate said plate with respect to said worm gear; coupling means operable to hold said cover to said plate to prevent relative rotation therebetween, and releasable so that said cover is rotatable with respect to said plate; a tiltable member mounted on said cover for rotation about an axis perpendicular to the axis of said worm gear; a segmental worm gear connected to said tiltable member for rotation therewith; a shaft mounted on said cover and rotatable with respect thereto; a second worm mounted on said shaft for axial and rotational movement with respect thereto; engaging means holding said second worm substantially immovable with respect to said shaft, and selectively releasable to free said worm for movement with respect to said shaft, thereby enabling the disengagement of said worm with respect to said segmental gear and the consequent release of said tiltable member for free rotation about its axis, the holding of said worm on said shaft while in engagement with said worm gear preventing the free rotation of said segmental worm gear and said tiltable member about their axis; and a second transmission means mounted on said cover and connected to said second worm to rotate the latter and thereby rotate said segmental worm gear and said tiltable member.

6. A camera head as described in claim 5 in which each of said transmission means includes a gear train having predetermined selectable ratios, said gear train being capable of operation by a power input shaft, but incapable of operation by attempted rotation of said cover or said tiltable member.

RALPH O. HOGE.

REFERENCES CITED

The following references are of record in the file of this patent:

UNITED STATES PATENTS

| Number | Name | Date |
|---|---|---|
| 1,150,304 | Schneider | Aug. 17, 1915 |
| 1,493,367 | Mery | May 6, 1924 |
| 1,618,773 | Meyers | Feb. 22, 1927 |
| 1,840,556 | Arnold | Jan. 12, 1932 |
| 2,384,790 | Bolsey | Sept. 18, 1945 |

FOREIGN PATENTS

| Number | Country | Date |
|---|---|---|
| 28,016 | Norway | of 1917 |
| 636,918 | Germany | Oct. 20, 1936 |
| 642,172 | Germany | Mar. 1, 1937 |